(12) United States Patent
Wu et al.

(10) Patent No.: US 10,114,809 B2
(45) Date of Patent: Oct. 30, 2018

(54) METHOD AND APPARATUS FOR PHONETICALLY ANNOTATING TEXT

(71) Applicant: Tencent Technology (Shenzhen) Company Limited, Shenzhen (CN)

(72) Inventors: Xiaoping Wu, Shenzhen (CN); Qiang Dai, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/191,309

(22) Filed: Jun. 23, 2016

(65) Prior Publication Data

US 2016/0306783 A1 Oct. 20, 2016

Related U.S. Application Data

(63) Continuation of application No. PCT/CN2015/075835, filed on Apr. 3, 2015.

(30) Foreign Application Priority Data

May 7, 2014 (CN) .......................... 2014 1 0190961

(51) Int. Cl.
*G06F 17/24* (2006.01)
*G06F 17/27* (2006.01)
(Continued)

(52) U.S. Cl.
CPC ........ *G06F 17/241* (2013.01); *G06F 17/2223* (2013.01); *G06F 17/274* (2013.01); *G06F 17/277* (2013.01); *G10L 13/08* (2013.01)

(58) Field of Classification Search
CPC ........ G10L 15/187; G10L 15/08; G10L 15/22
See application file for complete search history.

(56) References Cited

U.S. PATENT DOCUMENTS 5,212,730 A * 5/1993 Wheatley .............. G10L 15/063
704/232
5,873,111 A * 2/1999 Edberg ................ G06F 17/2755
704/8

(Continued)

FOREIGN PATENT DOCUMENTS

CN 1196535 A 10/1998
CN 101271687 A 9/2008
(Continued)

OTHER PUBLICATIONS

Tencent Technology, ISRWO, PCT/CN2015/075835, Jun. 26, 2015, 8 pgs.

(Continued)

*Primary Examiner* — Douglas Godbold
*Assistant Examiner* — Mark Villena
(74) *Attorney, Agent, or Firm* — Morgan, Lewis & Bockius LLP (57) ABSTRACT

Method for phonetically annotating text is performed at a computing device. The method includes: identifying a first polyphonic word segment in a text input, the first polyphonic word segment having at least a first pronunciation and a second pronunciation; determining at least a first probability for the first pronunciation and a second probability for the second pronunciation; determining a predetermined threshold difference based on: a comparison of the first and second probabilities with a preset threshold probability value, respectively, and a magnitude of a difference between the first and second probabilities; comparing the difference between the first probability and the second probability with the predetermined threshold difference; and selecting the first pronunciation as a current pronunciation for the first polyphonic word segment in accordance with a determination that the difference between the first probability and the (Continued)

second probability exceeds the predetermined threshold difference.

20 Claims, 6 Drawing Sheets

(51) Int. Cl.
*G10L 13/08* (2013.01)
*G06F 17/22* (2006.01)

(56) References Cited

U.S. PATENT DOCUMENTS

| | | | |
|---|---|---|---|
| 6,128,632 A | 10/2000 | McCully | |
| 2005/0143970 A1* | 6/2005 | Roth | G10L 15/063 704/4 |
| 2006/0200347 A1* | 9/2006 | Kim | G10L 15/22 704/236 |
| 2008/0147405 A1* | 6/2008 | Qing | G10L 13/10 704/258 |
| 2008/0154600 A1* | 6/2008 | Tian | G10L 15/083 704/251 |
| 2009/0157402 A1* | 6/2009 | Lin | G10L 15/187 704/254 |
| 2010/0070263 A1* | 3/2010 | Goto | G06F 17/30746 704/8 |
| 2010/0268535 A1* | 10/2010 | Koshinaka | G10L 15/06 704/236 |
| 2012/0213490 A1* | 8/2012 | Steiner | G06F 17/30793 386/241 |
| 2013/0041647 A1* | 2/2013 | Ramerth | G06F 17/2863 704/2 |
| 2013/0110511 A1* | 5/2013 | Spiegel | G10L 15/22 704/243 |
| 2013/0289974 A1* | 10/2013 | Yue | G06F 17/22 704/8 |
| 2015/0081295 A1* | 3/2015 | Yun | G10L 17/005 704/236 |

FOREIGN PATENT DOCUMENTS

| | | |
|---|---|---|
| CN | 101324884 A | 12/2008 |
| CN | 102651217 A | 8/2012 |
| CN | 103365925 A | 10/2013 |
| CN | 104142909 A | 11/2014 |

OTHER PUBLICATIONS

Tencent Technology, IPRP, PCT/CN2015/075835, Nov. 8, 2016, 6 pgs.

* cited by examiner

METHOD AND APPARATUS FOR PHONETICALLY ANNOTATING TEXT

PRIORITY CLAIM AND RELATED APPLICATION

This application is a continuation application of PCT Patent Application No. PCT/CN2015/075835, entitled "METHOD AND APPARATUS FOR PHONETICALLY ANNOTATING TEXT" filed on Apr. 3, 2015, which claims priority to Chinese Patent Application No. 201410190961.3 entitled "METHOD AND APPARATUS FOR PHONETICALLY ANNOTATING CHINESE CHARACTERS" filed on May 7, 2014, both of which are incorporated by reference in their entirety.

FIELD OF THE TECHNOLOGY

The present disclosure relates to the field of computer technologies, and in particular, to a Chinese character phonetic annotation method and apparatus.

BACKGROUND

With the wide application of Chinese characters, learners of Chinese often fail to pronounce some word segments in a process of reading a Chinese character text aloud, especially some polyphonic word segments. Therefore, the learners of Chinese always come across obstacles of reading aloud. Even though pronunciations of a polyphonic word segment can be obtained by looking up a dictionary, much time is required to do so. In addition, because a vocabulary included in the dictionary is large, it is difficult for a user to grasp the most accurate pronunciation of the polyphonic word segment. This lowers the efficiency and effects in text reading, thereby affecting effects in Chinese learning.

SUMMARY

To address the issues identified above, in some embodiments, a method of phonetically annotating Chinese character text is performed at a device (e.g., device 700 of FIG. 7) with one or more processors and memory. The method includes: identifying a first polyphonic word segment in a text input, the first polyphonic word segment having at least a first pronunciation and a second pronunciation; determining at least a first probability for the first pronunciation and a second probability for the second pronunciation; comparing a difference between the first probability and the second probability with a predetermined threshold difference; and selecting the first probability as a current pronunciation for the first polyphonic word segment in accordance with a determination that the difference between the first probability and the second probability exceeds the predetermined threshold difference.

Figure 7:
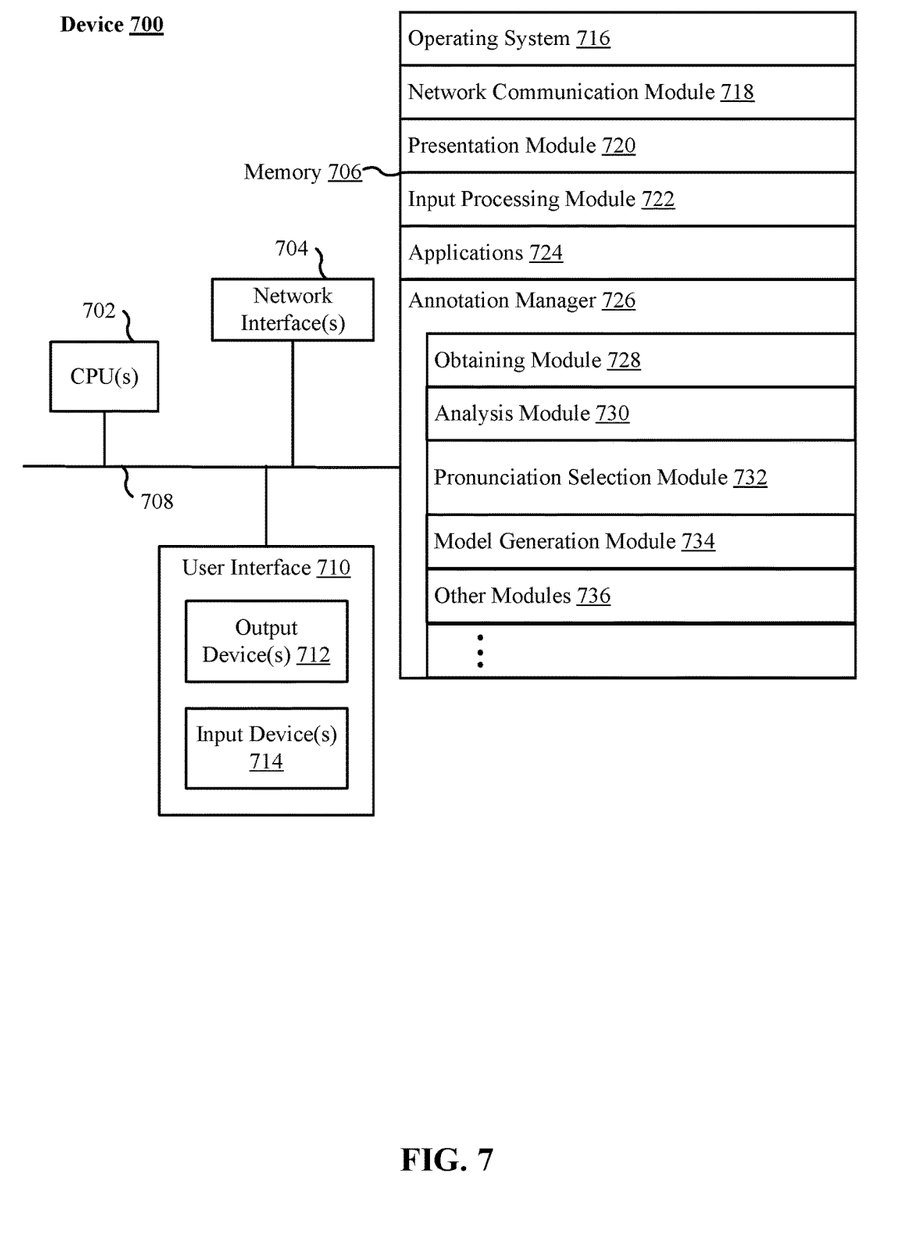
FIG. 7 is a schematic structural diagram of a Chinese character phonetic annotation apparatus in accordance with some embodiments.

In some embodiments, a computing device (e.g., device 700 of FIG. 7 or a component thereof (e.g., annotation manager 726)) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a computing device (e.g., device 700 of FIG. 7 or a component thereof (e.g., annotation manager 726)) with one or more processors, cause the computing device to perform, or control performance of, the operations of any of the methods described herein. In some embodiments, a computing device (e.g., device 700 of FIG. 7 or a component thereof (e.g., software manager 726)) includes means for performing, or controlling performance of, the operations of any of the methods described herein.

Various advantages of the present application are apparent in light of the descriptions below.

BRIEF DESCRIPTION OF THE DRAWINGS

The aforementioned features and advantages of the technology as well as additional features and advantages thereof will be more clearly understood hereinafter as a result of a detailed description of preferred embodiments when taken in conjunction with the drawings. The accompanying drawings in the following description are merely some embodiments of the present technology, and persons of ordinary skill in the art can derive other drawings and embodiments from the accompanying drawings without creative efforts.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present technology with reference to the accompanying drawings in the embodiments of the present technology. Apparently, the described embodiments are merely a part rather than all of the embodiments of the present technology. All other embodiments obtained by persons of ordinary skill in the art based on the embodiments of the present technology without creative efforts shall fall within the protection scope of the present disclosure.

A Chinese character phonetic annotation method provided in embodiments of the present technology is applicable to a scenario in which phonetic annotation is performed on a polyphonic word segment in a piece reading text. For example, when a Chinese character phonetic annotation apparatus receives a piece of input text, and phonetic annotation is performed on a polyphonic word segment in the input text, the Chinese character phonetic annotation apparatus acquires at least two pronunciations of the polyphonic word segment, predicts a probability of each pronunciation in the at least two pronunciations, generates a prediction result, and determines the pronunciation of the polyphonic word segment appropriate for the current scenario according to the prediction result. By predicting a probability of each pronunciation in at least two pronunciations of a polyphonic word segment, accuracy of phonetic annotation of a polyphonic word segment, and the efficiency and effects in text reading can be improved.

The Chinese character phonetic annotation apparatus related in the embodiments of the present technology may include terminal devices, such as a computer, a tablet computer, a smart phone, a notebook computer, a palmtop computer, and a mobile Internet device (MID). The text may be an article, a paragraph of literal content, a sentence, or a phrase written in Chinese characters, or a single Chinese character. The polyphonic word segment may be a polyphonic Chinese character or a polyphonic phrase (e.g., a phrase or word with two or more Chinese characters at least one of which is a polyphonic character) in the text.

The Chinese character phonetic annotation method provided in the embodiments of the present technology is described below in detail with reference to FIGS. 1-3.

Figure 1:
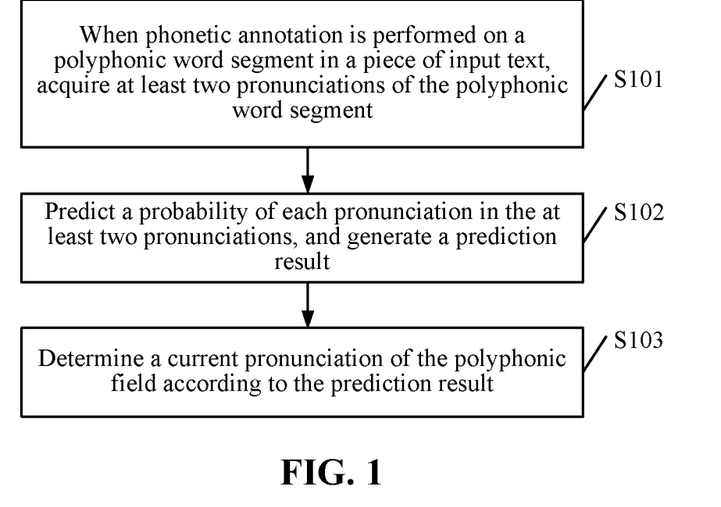
FIG. 1 is a schematic flowchart of a Chinese character phonetic annotation method in accordance with some embodiments.

FIG. 1 is a schematic flowchart of a Chinese character phonetic annotation method according to an embodiment of the present technology. As shown in FIG. 1, the method in the embodiment of the present technology includes the following step S101 to step S103.

S101: When phonetic annotation is performed on a polyphonic word segment in a piece of input text, acquire at least two pronunciations of the polyphonic word segment.

Specifically, a user may input a piece of text on which phonetic annotation is to be performed into a Chinese character phonetic annotation apparatus, and an input manner may be copying and pasting the text, or scanning the text by using a scanning device. The Chinese character phonetic annotation apparatus acquires the text, e.g., from the user, and when the Chinese character phonetic annotation apparatus performs phonetic annotation on a polyphonic word segment in the text, the Chinese character phonetic annotation apparatus acquires at least two pronunciations of the polyphonic word segment.

It should be noted that, before phonetic annotation is performed on the polyphonic word segment in the input text, the Chinese character phonetic annotation apparatus needs to perform word segmentation processing on the text. For example, it is assumed that the text is "可以带你去 长长见识", the Chinese character phonetic annotation apparatus may preferably perform word segmentation processing on the text according to parts of speech, and after word segmentation processing is performed, the text is "可以/带/你/去/长长/见识".

The Chinese character phonetic annotation apparatus may acquire a word segment in the text and pronunciation property information of the word segment after word segmentation processing is performed. The pronunciation property information includes the number of pronunciations and a default pronunciation. It can be understood that, a character dictionary and a phrase dictionary of commonly used phrases which together include possible pronunciations of all word segments are pre-established in the Chinese character phonetic annotation apparatus. For a Chinese character having only one pronunciation, a correspondence between the Chinese character and the pronunciation is directly established in the character dictionary, and the pronunciation is used as a default pronunciation of the Chinese character, and for a polyphonic Chinese character, a pronunciation used most frequently is used as the default pronunciation of the polyphonic Chinese character. Settings of the phrase dictionary are the same as settings of the character dictionary. For a phrase (e.g., a word or expression consisting of more than one characters) having only one pronunciation, a correspondence between the phrase and the pronunciation is established in the phrase dictionary, the pronunciation is used as a default pronunciation of the phrase, and for a polyphonic phrase, a pronunciation used most frequently is used as a default pronunciation of the polyphonic phrase. For example, a polyphonic phrase "长长" has three pronunciations, which are "chang2 chang2, zhang3 chang2, and zhang3 zhang3" separately, where numbers after the phonetic alphabets indicate tones (such a format is uniformly used below), and because "chang2 chang2" is used most frequently, "chang2 chang2" is used as a default pronunciation of "长长". For some fixed phrases or so-called idioms, for example, "曝" has two pronunciations, and has a unique pronunciation in "一曝十寒", and "一曝十寒" is an idiom and can be considered as a commonly used phrase, thus a phrase dictionary of commonly used phrases can be further established to partially determine the pronunciations of polyphonic characters when they appear in commonly used phrases.

Therefore, using the text "可以/带/你/ 去/长长/见识" on which word segmentation processing has been performed as an example, the acquired pronunciation property information of the word segments in the text is as follows (word segment/part of speech/the number of pronunciations/default pronunciation):

可以/adv/1/ke3 yi3;
带/v/1/dai4;
你/pron/1/ni3;
去/v/1/qu4;
长长/v/3/chang2 chang2; and
见识/n/1/jian4 shi3.

The pronunciation property information may further include a part of speech of each word segment, and the number of pronunciations and the default pronunciation are searched for by means of a combination of a part of speech and a word segment, which can further improve the accuracy of phonetic annotation. It should be noted that, if the word segment "可以" is not recorded in the phrase dictionary, the Chinese character phonetic annotation apparatus can separately query the character dictionary for pronunciation property information of "可" and "以".

Further, when the number of pronunciations is greater than 1, the Chinese character phonetic annotation apparatus determines the word segment as a polyphonic word segment, and acquires at least two pronunciations of the polyphonic word segment; and when the number of pronunciations is equal to 1, the Chinese character phonetic annotation apparatus determines the default pronunciation as a current pronunciation of the word segment.

S102: Predict a probability of each pronunciation in the at least two pronunciations, and generate a prediction result.

Specifically, after the Chinese character phonetic annotation apparatus acquires the at least two pronunciations of the polyphonic word segment, the Chinese character phonetic annotation apparatus acquires a probability value of each pronunciation in the at least two pronunciations, and generates a prediction result according to a numerical value of the probability value of each pronunciation.

Further, the Chinese character phonetic annotation apparatus pre-stores a training corpus including specific polyphonic word segments, and acquires a CRF model of each polyphonic word segment in the specific polyphonic word segments by using a Conditional Random Fields (CRF) training algorithm, where the CRF model is a model established by the Chinese character phonetic annotation apparatus by analyzing language characteristics (for example, a preceding word, a succeeding word, a part of speech, the beginning of a sentence, the ending of a sentence, and other specific phrases or sentence structures) of the training corpus. The Chinese character phonetic annotation apparatus may acquire a CRF model of the polyphonic word segment according to the pre-stored training corpus, acquire the probability value of each pronunciation in the at least two pronunciations by analyzing word segment characteristics (for example, a preceding word, a succeeding word, a part of speech, the beginning of a sentence, the ending of a sentence, and other specific phrases or sentence structures) of the polyphonic word segment in the text, and acquire a difference between a first probability value and a second probability value in the probability values of the pronunciations. When the difference is greater than a preset threshold, the Chinese character phonetic annotation apparatus determines that a pronunciation corresponding to the first probability value is a pronunciation having the highest priority. When the difference is less than or equal to the preset threshold, the Chinese character phonetic annotation apparatus determines that the default pronunciation is the pronunciation having the highest priority. The first probability value is the largest probability value in the probability values of the pronunciations, the second probability value is the second largest probability value in the probability values of the pronunciations, and the preset threshold is set according to a heuristic method.

Referring to the foregoing example, the polyphonic word segment is "长长", and has three pronunciations, which are "chang2 chang2, zhang3 chang2, and zhang3 zhang3" separately, and corresponding probability values acquired by analyzing are 0.2, 0.1, and 0.7, respectively. Therefore, the first probability value is 0.7, and the second probability value is 0.2. It is assumed that the preset threshold is 0.1, because a difference between the first probability value and the second probability value is 0.5, and is greater than the preset threshold 0.1, a pronunciation corresponding to the first probability value, that is, "zhang3 zhang3", is determined as the pronunciation having the highest priority.

S103: Determine a current pronunciation of the polyphonic word segment according to the prediction result.

Specifically, the Chinese character phonetic annotation apparatus determines the pronunciation having the highest priority as the current pronunciation of the polyphonic word segment.

Further, the Chinese character phonetic annotation apparatus outputs the text and current phonetic symbols corresponding to the word segments in the text. Referring to the foregoing example, an output result is "可以带你去长长见识 (ke3 yi3 dai4 ni3 qu4 zhang3 zhang3 jian4 shi2)". The output result can be converted to voice for output.

In the embodiment of the present technology, when phonetic annotation is performed on a polyphonic word segment in an input text, a probability of each pronunciation in at least two pronunciations of the polyphonic word segment is predicted, and a current pronunciation of the polyphonic word segment is determined according to a prediction result, which implements accurate phonetic annotation of the polyphonic word segment; and the number of pronunciations and the default pronunciation are searched for by means of a combination of a part of speech and a word segment, which can further improve the accuracy of phonetic annotation, and improve the efficiency and effects in text reading, thereby improving effects in Chinese learning.

Figure 2:
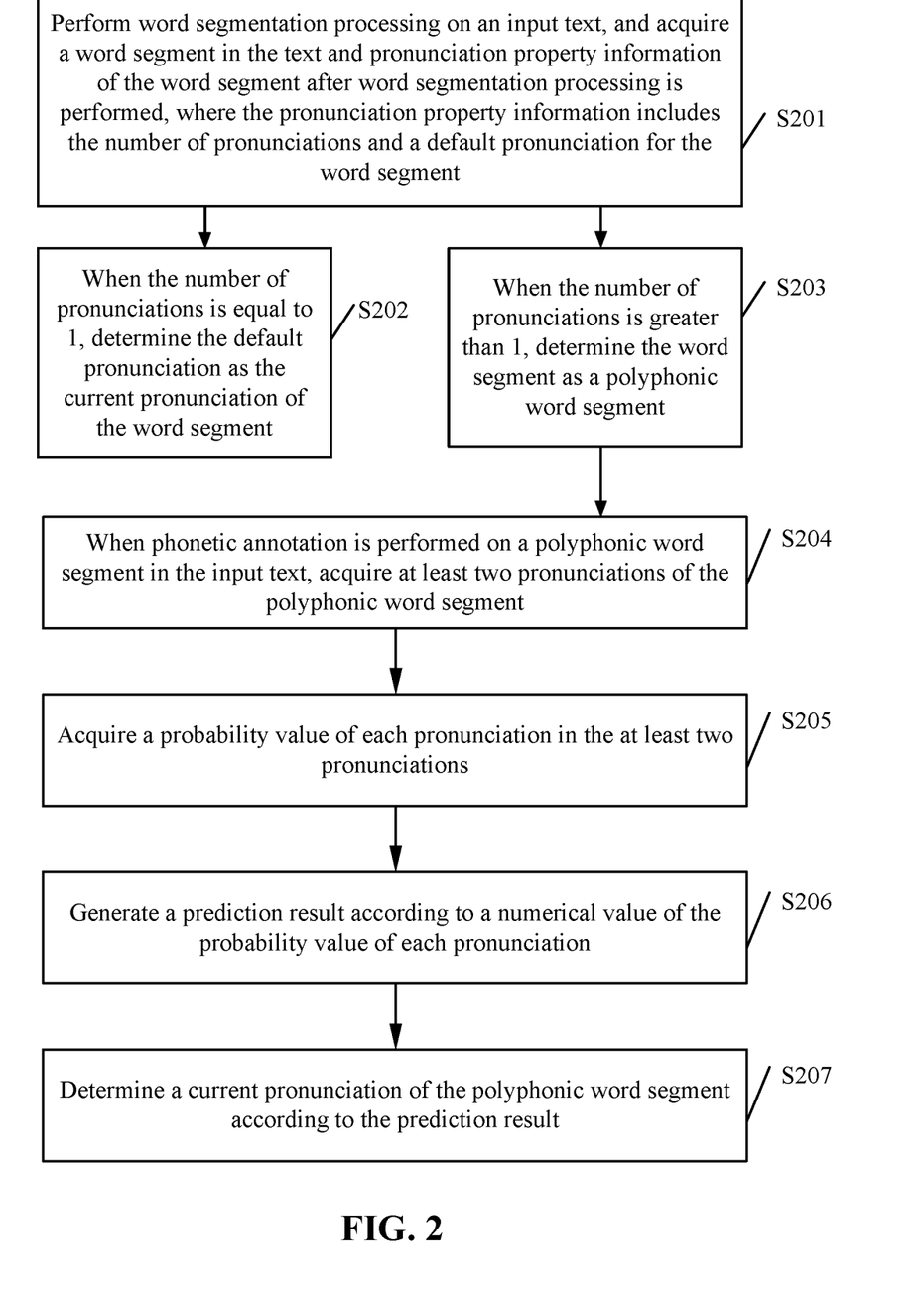
FIG. 2 is a schematic flowchart of a Chinese character phonetic annotation method in accordance with some embodiments.

FIG. 2 is a schematic flowchart of another Chinese character phonetic annotation method according to an embodiment of the present technology. As shown in FIG. 2, the method in the embodiment of the present technology includes the following step S201 to step S207.

S201: Perform word segmentation processing on an input text, and acquire a word segment in the text and pronunciation property information of the word segment after word segmentation processing is performed, where the pronunciation property information includes the number of pronunciations and a default pronunciation for the word segment.

Specifically, a user may input a piece of text on which phonetic annotation is to be performed into a Chinese character phonetic annotation apparatus, an input manner may be copying and pasting the text, or scanning the text by using a scanning device; and the Chinese character phonetic annotation apparatus needs to perform word segmentation processing on the text. For example, it is assumed that the text is "可以带你去 长长见识", the Chinese character phonetic annotation apparatus may preferably perform word segmentation processing on the text according to parts of speech, and after word segmentation processing is performed, the text is "可以/带/你/ 去/长长/见识".

The Chinese character phonetic annotation apparatus may acquire the word segment in the text and the pronunciation property information of the word segment after word segmentation processing is performed. The pronunciation property information includes the number of pronunciations and the default pronunciation. It can be understood that, a character dictionary including pronunciations of all word segments each having a single character and a phrase dictionary of phrases each having more than one character (e.g., including words with more than one characters, and commonly used idioms) are pre-established in the Chinese character phonetic annotation apparatus. For a Chinese character having only one pronunciation, a correspondence between the Chinese character and the pronunciation is directly established in the character dictionary, and the pronunciation is used as a default pronunciation of the Chinese character, and for a polyphonic Chinese character, a pronunciation used most frequently is used as a default pronunciation of the polyphonic Chinese character. Settings of the phrase dictionary are the same as settings of the character dictionary. For a phrase having only one pronunciation, a correspondence between the phrase and the pronunciation is established in the phrase dictionary, the pronunciation is used as a default pronunciation of the phrase, and for a polyphonic phrase, a pronunciation used most frequently is used as a default pronunciation of the polyphonic phrase. For example, a polyphonic phrase "长长" has three pronunciations, which are "chang2 chang2, zhang3 chang2, and zhang3 zhang3" separately, where numbers after the phonetic alphabets indicate tones (such a format is uniformly used below), and because "chang2 chang2" is used most frequently, "chang2 chang2" is used as a default pronunciation of "长长". For some fixed phrases, for example, "曝" has two pronunciations, and has a unique pronunciation in "一曝十寒", and "一曝十寒" is a set phrase and can be considered as a commonly used phrase, so that the phrase dictionary of commonly used phrases can be further established, and pronunciations of polyphonic characters in commonly used phrases are partially determined.

Therefore, using the text "可以/带/你/ 去/长长/见识" on which word segmentation processing has been performed as an example, the acquired pronunciation property information of the word segments in the text is as follows (word segment/part of speech/the number of pronunciations/default pronunciation):

可以/adv/1/ke3 yi3;
带/v/1/dai4;
你/pron/1/ni3;
去/v/1/qu4;
长长/v/3/chang2 chang2; and
见识/n/1/jian4 shi3.

The pronunciation property information may further include a part of speech of each word segment, and the number of pronunciations and the default pronunciation are searched for by means of a combination of a part of speech and a word segment, which can further improve the accuracy of phonetic annotation. It should be noted that, if the word segment of "可以" is not recorded in the phrase dictionary, the Chinese character phonetic annotation apparatus can separately query the character dictionary for pronunciation property information of "可" and "以".

S202: When the number of pronunciations is equal to 1, determine the default pronunciation as a current pronunciation of the word segment.

Specifically, when the number of pronunciations is equal to 1, the Chinese character phonetic annotation apparatus determines the default pronunciation as the current pronunciation of the word segment.

S203: When the number of pronunciations is greater than 1, determine the word segment as a polyphonic word segment.

Specifically, when the number of pronunciations is greater than 1, the Chinese character phonetic annotation apparatus determines the word segment as a polyphonic word segment, and acquires at least two pronunciations of the polyphonic word segment.

S204: When phonetic annotation is performed on a polyphonic word segment in the input text, acquire at least two pronunciations of the polyphonic word segment.

Specifically, the Chinese character phonetic annotation apparatus acquires the text of the user, and when the Chinese character phonetic annotation apparatus performs phonetic annotation on the polyphonic word segment in the text, the Chinese character phonetic annotation apparatus acquires the at least two pronunciations of the polyphonic word segment.

S205: Acquire a probability value of each pronunciation in the at least two pronunciations.

Specifically, after the Chinese character phonetic annotation apparatus acquires the at least two pronunciations of the polyphonic word segment, the Chinese character phonetic annotation apparatus separately acquires the probability value of each pronunciation in the at least two pronunciations.

Further, the Chinese character phonetic annotation apparatus pre-stores a training corpus including specific polyphonic word segments, and acquires a CRF model of each polyphonic word segment in the specific polyphonic word segments by using a CRF training algorithm, where the CRF model is a model established by the Chinese character phonetic annotation apparatus by analyzing language characteristics (for example, a preceding word, a succeeding word, a part of speech, the beginning of a sentence, the ending of a sentence, and other specific phrases or sentence structures) of the training corpus. The Chinese character phonetic annotation apparatus may acquire a CRF model of the polyphonic word segment according to the pre-stored training corpus, and acquire the probability value of each pronunciation in the at least two pronunciations by analyzing word segment characteristics (for example, a preceding word, a succeeding word, a part of speech, the beginning of a sentence, the ending of a sentence, and other specific phrases or sentence structures) of the polyphonic word segment in the text.

S206: Generate a prediction result according to a numerical value of the probability value of each pronunciation.

Specifically, the Chinese character phonetic annotation apparatus generates the prediction result according to the numerical value of the probability value of each pronunciation. Further, the Chinese character phonetic annotation apparatus acquires a difference between a first probability value and a second probability value in the probability values of the pronunciations. When the difference is greater than a preset threshold, the Chinese character phonetic annotation apparatus determines that a pronunciation corresponding to the first probability value is a pronunciation having the highest priority. When the difference is less than or equal to the preset threshold, the Chinese character phonetic annotation apparatus determines that the default pronunciation is the pronunciation having the highest priority. The first probability value is the largest probability value in the probability values of the pronunciations, the second probability value is a second largest probability value in the probability values of the pronunciations, and the preset threshold is set according to human experience.

Referring to the foregoing example, the polyphonic word segment is "长长", and has three pronunciations, which are "chang2 chang2, zhang3 chang2, and zhang3 zhang3" separately, and corresponding probability values acquired by analyzing are 0.2, 0.1, and 0.7. Therefore, the first probability value is 0.7, and the second probability value is 0.2. It is assumed that the preset threshold is 0.1, because a difference between the first probability value and the second probability value is 0.5, and is greater than the preset threshold, a pronunciation corresponding to the first probability value, that is, "zhang3 zhang3", is determined as the pronunciation having the highest priority.

S207: Determine a current pronunciation of the polyphonic word segment according to the prediction result.

For Step S207 of the embodiment of the present technology, reference may be made to step S103 in the embodiment shown in FIG. 1, which is not described herein again.

In the embodiment of the present technology, when phonetic annotation is performed on a polyphonic word segment in an input text, a probability of each pronunciation in at least two pronunciations of the polyphonic word segment is predicted, and a current pronunciation of the polyphonic word segment is determined according to a prediction result, which implements accurate phonetic annotation of the polyphonic word segment; and the number of pronunciations and the default pronunciation are searched for by means of a combination of a part of speech and a word segment, and a pre-established character dictionary including pronunciations of all word segments and phrase dictionary of commonly used phrases, and a pre-stored training corpus are used, which can further improve the accuracy of phonetic annotation, and improve the efficiency and effects in text reading, thereby improving effects in Chinese learning.

Figure 3:
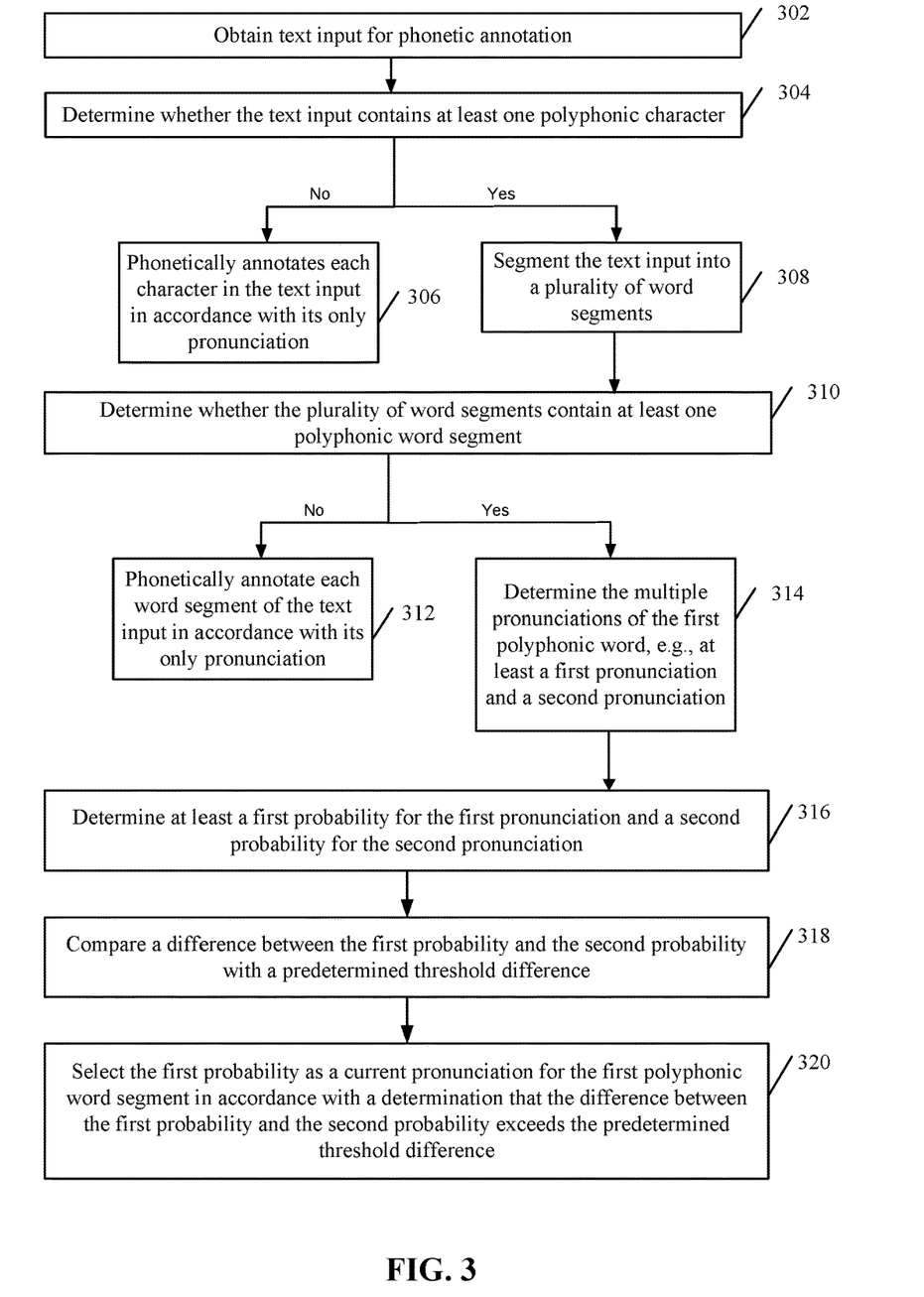
FIG. 3 is a schematic flowchart of a Chinese character phonetic annotation method in accordance with some embodiments.

FIG. 3 is a flowchart for a method for phonetically annotating text, in particular, text written in Chinese characters. The method is performed at a device having one or more processors and memory, such as the device 700 shown in FIG. 7.

In some embodiments, the device obtains (302) text input for phonetic annotation. The text input may be input by a user using an input device (e.g., a keyboard or a touch-based writing surface) or retrieved from a storage medium, such as a memory card, storage disc, or a networked storage device. In some embodiments, before employing the polyphonic annotation techniques described in the present disclosure, the device first determines (304) whether the text input contains at least one polyphonic character. In some embodiments, the device stores a character dictionary which includes a collection of polyphonic characters, and each polyphonic character has two or more possible pronunciations. For example, the character "长" and the character "重" each has two possible pronunciations. In accordance with a determination that the text input includes no polyphonic character, the device phonetically annotates (306) each character in the text input in accordance with its only pronunciation. In such a scenario, the polyphonic annotation techniques described herein are not deployed. In accordance with a determination that the text input includes at least one polyphonic character, the device segments (308) the text input into a plurality of word segments. In some embodiments, the segmentation is performed based on part of speech and other rules, such as rules related to grammar and usage. Each work segment may include a single character or more than one character. For example, "长长" and "重重" are two word segments each having two characters.

Sometimes, a word segment including a polyphonic character may only have a single pronunciation as a whole. For example, although the character "曝" has two pronunciations "bao4" and "pu4" in general, when it is used in an idiom "一曝十寒", the whole idiom has a unique pronunciation "yi1 pu4 shi2 han2". In some embodiments, suppose that after the segmentation, the text input is segmented into a plurality of word segments including a first polyphonic word segment. The device determines (310) whether the plurality of word segments contain at least one polyphonic word segment. In accordance with a determination that the plurality of word segments does not contain any polyphonic word segment, the device phonetically annotates (312) each word segment of the text input in accordance with its only pronunciation. In some embodiments, the device stores a phrase dictionary which includes polyphonic phrases that include words and expressions each consisting of more than one character and having more than one pronunciation. If a word segment is a single character segment, the device determines whether it has more than one pronunciation using the polyphonic character dictionary, and if a word segment is a multi-character phrase, the device uses the polyphonic phrase dictionary to determine if it has more than one pronunciation. In accordance with a determination that the plurality of word segments contains at least one polyphonic word segment, e.g., the first polyphonic word segment, the device determines (314) the multiple pronunciations of the first polyphonic word, e.g., at least a first pronunciation and a second pronunciation.

In some embodiments, after identifying the first polyphonic word segment in the text input and determining at least the first pronunciation and the second pronunciation, the device determines (316) at least a first probability for the first pronunciation and a second probability for the second pronunciation. In some embodiments, the first pronunciation and the second pronunciation are the two pronunciations having the largest probabilities among all possible pronunciations of the first polyphonic word segment.

In some embodiments, the device compares (318) a difference between the first probability and the second probability with a predetermined threshold difference. The device selects (320) the first probability as a current pronunciation for the first polyphonic word segment in accordance with a determination that the difference between the first probability and the second probability exceeds the predetermined threshold difference.

In some embodiments, before comparing the first and second probabilities to the predetermined threshold difference, the device selects a current value for the predetermined threshold difference based on the first probability and the second probability. For example, in some embodiments, selecting the current value for the predetermined threshold difference based on the first probability and the second probability further includes: selecting a first difference value for the predetermined threshold difference when both the first and the second probabilities are above a predetermined threshold probability value; and selecting a second difference value for the predetermined threshold difference when the first probability is above the predetermined threshold probability value and the second probability is below the predetermined threshold probability value. In some embodiments, the first difference value is smaller than the second difference value. For example, if both the first probability and the second probability are relatively large (e.g., larger than 40%), the threshold difference may be a smaller value, e.g., 10%, while if only the first probability is large (e.g., first probability is 60%) and the second probability is not very large (e.g., second probability is 30%), then a larger threshold difference value (e.g., threshold difference of 30%) may be required.

Other details of the method are described with respect to FIGS. 1 and 2, and are not repeated here in the interest of brevity.

Figure 4:
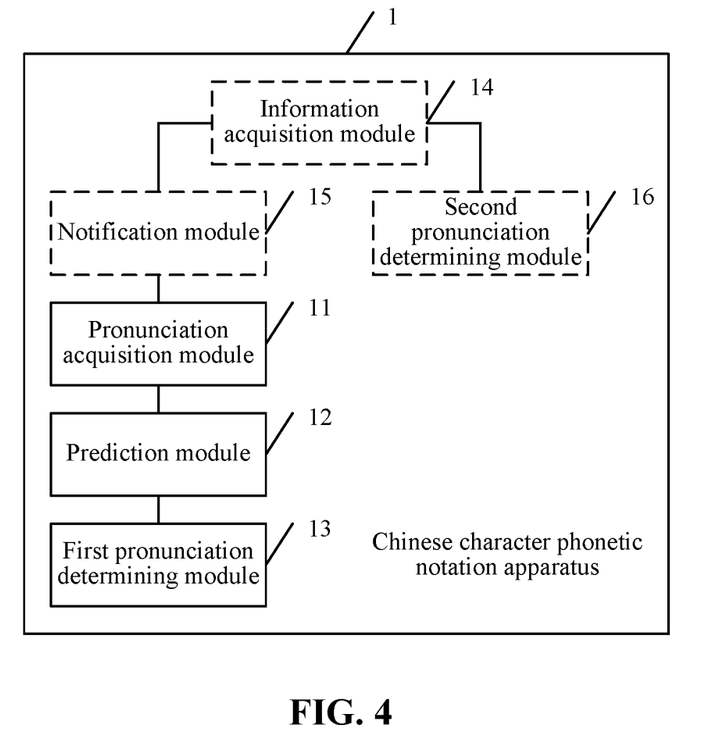
FIG. 4 is a schematic structural diagram of a Chinese character phonetic annotation apparatus in accordance with some embodiments.
Figure 5:
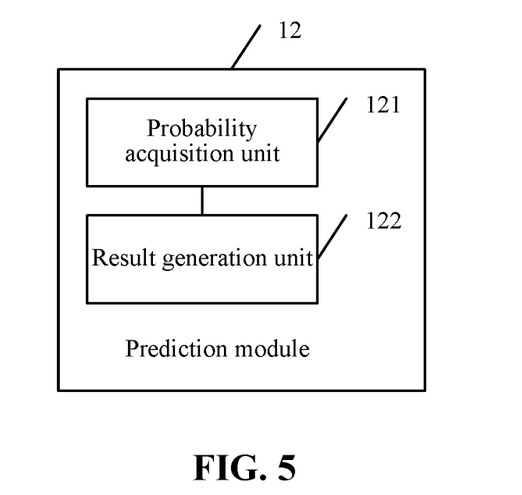
FIG. 5 is a schematic structural diagram of a prediction module in accordance with some embodiments.
Figure 6:
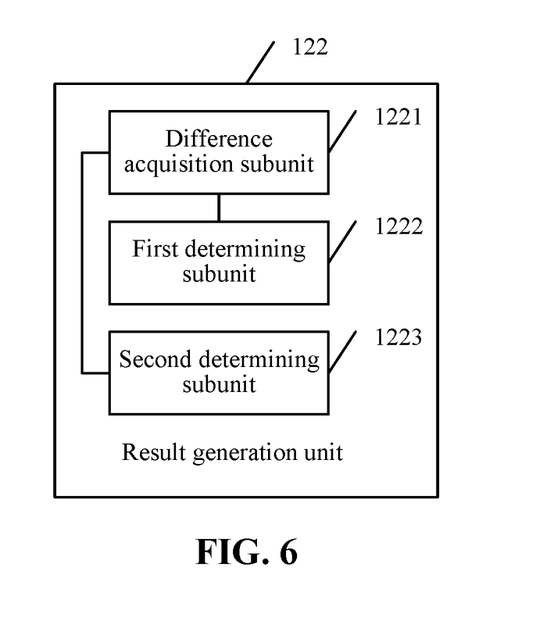
FIG. 6 is a schematic structural diagram of a result generation unit in accordance with some embodiments.

A Chinese character phonetic annotation apparatus provided in embodiments of the present technology is described below in detail with reference to FIG. 4 to FIG. 6. It should be noted that, Chinese character phonetic annotation apparatuses shown in FIG. 4 to FIG. 6 are used for performing the methods of the embodiments shown in FIG. 1 and FIG. 2 in the present technology. For the convenience of description, only a part relevant to the embodiments of the present technology is shown. For undisclosed specific technical details, refer to the embodiments shown in FIG. 1 and FIG. 2 in the present technology.

FIG. 4 is a schematic structural diagram of a Chinese character phonetic annotation apparatus according to an embodiment of the present technology. As shown in FIG. 4, the Chinese character phonetic annotation apparatus 1 in the embodiment of the present technology may include: a pronunciation acquisition module 11, a prediction module 12, and a first pronunciation determining module 13.

The pronunciation acquisition module 11 is used for: when phonetic annotation is performed on a polyphonic word segment in an input text, acquiring at least two pronunciations of the polyphonic word segment.

In a specific implementation, a user may input a text on which phonetic annotation is to be performed into the Chinese character phonetic annotation apparatus 1, and an input manner may be copying and pasting the text, or scanning the text by using a scanning device; and the Chinese character phonetic annotation apparatus 1 acquires the text of the user, and when the Chinese character phonetic annotation apparatus performs phonetic annotation on a polyphonic word segment in the text, the pronunciation acquisition module 11 acquires at least two pronunciations of the polyphonic word segment.

It should be noted that, before phonetic annotation is performed on the polyphonic word segment in the input text, the Chinese character phonetic annotation apparatus 1 needs to perform word segmentation processing on the text. For example, it is assumed that the text is "可以带你去长长见识", the Chinese character phonetic annotation apparatus 1 may preferably perform word segmentation processing on the text according to parts of speech, and after word segmentation processing is performed, the text is "可以/带/你/去/长长/见识".

The Chinese character phonetic annotation apparatus 1 may acquire a word segment in the text and pronunciation property information of the word segment after word segmentation processing is performed. The pronunciation property information includes the number of pronunciations and a default pronunciation. It can be understood that, a character dictionary including pronunciations of all word segments and a phrase dictionary of commonly used phrases are pre-established in the Chinese character phonetic annotation apparatus 1. For a Chinese character having only one pronunciation, a correspondence between the Chinese character and the pronunciation is directly established in the character dictionary, and the pronunciation is used as a default pronunciation of the Chinese character, and for a polyphonic Chinese character, a pronunciation used most frequently is used as a default pronunciation of the polyphonic Chinese character. Settings of the phrase dictionary are the same as settings of the character dictionary. For a phrase having only one pronunciation, a correspondence between the phrase and the pronunciation is established in the phrase dictionary, the pronunciation is used as a default pronunciation of the phrase, and for a polyphonic phrase, a pronunciation used most frequently is used as a default pronunciation of the polyphonic phrase. For example, a polyphonic phrase "长长" has three pronunciations, which are "chang2 chang2, zhang3 chang2, and zhang3 zhang3" separately, where numbers after the phonetic alphabets indicate tones (such a format is uniformly used below), and because "chang2 chang2" is used most frequently, "chang2 chang2" is used as a default pronunciation of "长长". For some fixed phrases, for example, "曝" has two pronunciations, and has a unique pronunciation in "一曝十寒", and "一曝十寒" is a set phrase and can be considered as a commonly used phrase, so that the phrase dictionary of commonly used phrases can be further established, and pronunciations of polyphonic characters in commonly used phrases are partially determined.

Therefore, using the text "可以/带/你/ 去/长长/见识" on which word segmentation processing has been performed as an example, the acquired pronunciation property information of the word segments in the text is as follows (word segment/part of speech/the number of pronunciations/default pronunciation):

可以/adv/1/ke3 yi3;
带/v/1/dai4;
你/pron/1/ni3;
去/v/1/qu4;
长长/v/3/chang2 chang2; and
见识/n/1/jian4 shi3.

The pronunciation property information may further include a part of speech of each word segment, and the number of pronunciations and the default pronunciation are searched for by means of a combination of a part of speech and a word segment, which can further improve the accuracy of phonetic annotation. It should be noted that, if the word segment of "可以" is not recorded in the phrase dictionary, the Chinese character phonetic annotation apparatus 1 can separately query the character dictionary for pronunciation property information of "可" and "以".

Further, when the number of pronunciations is greater than 1, the Chinese character phonetic annotation apparatus 1 determines the word segment as a polyphonic word segment, and instructs the pronunciation acquisition module 11 to acquire at least two pronunciations of the polyphonic word segment; and when the number of pronunciations is equal to 1, the Chinese character phonetic annotation apparatus 1 determines the default pronunciation as a current pronunciation of the word segment.

The prediction module 12 is used for predicting a probability of each pronunciation in the at least two pronunciations, and generating a prediction result.

In a specific implementation, after the pronunciation acquisition module 11 acquires the at least two pronunciations of the polyphonic word segment, the prediction module 12 acquires a probability value of each pronunciation in the at least two pronunciations, and generates a prediction result according to a numerical value of the probability value of each pronunciation.

Further, the Chinese character phonetic annotation apparatus 1 pre-stores a training corpus including specific polyphonic word segments, and acquires a CRF model of each polyphonic word segment in the specific polyphonic word segments by using a CRF training algorithm, where the CRF model is a model established by the Chinese character phonetic annotation apparatus 1 by analyzing language characteristics (for example, a preceding word, a succeeding word, a part of speech, the beginning of a sentence, the ending of a sentence, and other specific phrases or sentence structures) of the training corpus. The prediction module 12 may acquire a CRF model of the polyphonic word segment according to the pre-stored training corpus, acquire the probability value of each pronunciation in the at least two pronunciations by analyzing word segment characteristics (for example, a preceding word, a succeeding word, a part of speech, the beginning of a sentence, the ending of a sentence, and other specific phrases or sentence structures) of the polyphonic word segment in the text, and acquire a difference between a first probability value and a second probability value in the probability values of the pronunciations. When the difference is greater than a preset threshold, the prediction module 12 determines that a pronunciation corresponding to the first probability value is a pronunciation having the highest priority. When the difference is less than or equal to the preset threshold, the prediction module 12 determines that the default pronunciation is the pronunciation having the highest priority. The first probability value is the largest probability value in the probability values of the pronunciations, the second probability value is a second largest probability value in the probability values of the pronunciations, and the preset threshold is set according to human experience.

Referring to the foregoing example, the polyphonic word segment is "长长", and has three pronunciations, which are "chang2 chang2, zhang3 chang2, and zhang3 zhang3" separately, and corresponding probability values acquired by analyzing are 0.2, 0.1, and 0.7. Therefore, the first probability value is 0.7, and the second probability value is 0.2. It is assumed that the preset threshold is 0.1, because a difference between the first probability value and the second probability value is 0.5, and is greater than the preset threshold, a pronunciation corresponding to the first probability value, that is, "zhang3 zhang3", is determined as the pronunciation having the highest priority.

The first pronunciation determining module 13 is used for determining the current pronunciation of the polyphonic word segment according to the prediction result.

In a specific implementation, the first pronunciation determining module 13 determines the pronunciation having the highest priority as the current pronunciation of the polyphonic word segment.

Further, the Chinese character phonetic annotation apparatus 1 outputs the text and current phonetic symbols corresponding to the word segments in the text. Referring to the foregoing example, an output result is "可以带你去长长见识 (ke3 yi3 dai4 ni3 qu4 zhang3 zhang3 jian4 shi2)". The output result can be converted to voice for output.

In the embodiment of the present technology, when phonetic annotation is performed on a polyphonic word segment in an input text, a probability of each pronunciation in at least two pronunciations of the polyphonic word segment is predicted, and a current pronunciation of the polyphonic word segment is determined according to a prediction result, which implements accurate phonetic annotation of the polyphonic word segment; and the number of pronunciations and the default pronunciation are searched for by means of a combination of a part of speech and a word segment, which can further improve the accuracy of phonetic annotation, and improve the efficiency and effects in text reading, thereby improving effects in Chinese learning.

As shown in FIG. 4, in some embodiments, the Chinese character phonetic annotation apparatus 1 according to the embodiment of the present technology may further include: an information acquisition module 14, a notification module 15, and a second pronunciation determining module 16.

The information acquisition module 14 is used for performing word segmentation processing on an input text, and acquiring a word segment in the text and pronunciation property information of the word segment after word segmentation processing is performed, where the pronunciation property information includes the number of pronunciations and a default pronunciation.

In a specific implementation, a user may input a text on which phonetic annotation is to be performed into the Chinese character phonetic annotation apparatus 1, an input manner may be copying and pasting the text, or scanning the text by using a scanning device; and the information acquisition module 14 needs to perform word segmentation processing on the text. For example, it is assumed that the text is "可以带你去 长长见识", the information acquisition module 14 may preferably perform word segmentation processing on the text according to parts of speech, and after word segmentation processing is performed, the text is "可以/带/你/去/长长/见识".

The information acquisition module 14 may acquire the word segment in the text and the pronunciation property information of the word segment after word segmentation processing is performed. The pronunciation property information includes the number of pronunciations and the default pronunciation. It can be understood that, a character dictionary including pronunciations of all word segments and a phrase dictionary of commonly used phrases are pre-established in the Chinese character phonetic annotation apparatus 1. For a Chinese character having only one pronunciation, a correspondence between the Chinese character and the pronunciation is directly established in the character dictionary, and the pronunciation is used as a default pronunciation of the Chinese character, and for a polyphonic Chinese character, a pronunciation used most frequently is used as a default pronunciation of the polyphonic Chinese character. Settings of the phrase dictionary are the same as settings of the character dictionary. For a phrase having only one pronunciation, a correspondence between the phrase and the pronunciation is established in the phrase dictionary, the pronunciation is used as a default pronunciation of the phrase, and for a polyphonic phrase, a pronunciation used most frequently is used as a default pronunciation of the polyphonic phrase. For example, a polyphonic phrase "长长" has three pronunciations, which are "chang2 chang2, zhang3 chang2, and zhang3 zhang3" separately, where numbers after the phonetic alphabets indicate tones (such a format is uniformly used below), and because "chang2 chang2" is used most frequently, "chang2 chang2" is used as a default pronunciation of "长长". For some fixed phrases, for example, "曝" has two pronunciations, and has a unique pronunciation in "一曝十寒", and "一曝十寒" is a set phrase and can be considered as a commonly used phrase, so that the phrase dictionary of commonly used phrases can be further established, and pronunciations of polyphonic characters in commonly used phrases are partially determined.

Therefore, using the text "可以/带/你/去 /长长/见识" on which word segmentation processing has been performed as an example, the acquired pronunciation property information of the word segments in the text is as follows (word segment/ part of speech/the number of pronunciations/default pronunciation):

可以/adv/1/ke3 yi3;
带/v/1/dai4;
你/pron/1/ni3;
去/v/1/qu4;
长长/v/3/chang2 chang2; and
见识/1/jian4 shi3.

The pronunciation property information may further include a part of speech of each word segment, and the number of pronunciations and the default pronunciation are searched for by means of a combination of a part of speech and a word segment, which can further improve the accuracy of phonetic annotation. It should be noted that, if the word segment of "可以" is not recorded in the phrase dictionary, the information acquisition module 14 can separately query the character dictionary for pronunciation property information of "可" and "以".

The notification module 15 is used for: when the number of pronunciations is greater than 1, determining the word segment as a polyphonic word segment, and instructing the pronunciation acquisition module 11 to perform the step of acquiring at least two pronunciations of the polyphonic word segment.

In a specific implementation, when the number of pronunciations is greater than 1, the notification module 15 determines the word segment as a polyphonic word segment, and instructs the pronunciation acquisition module 11 to acquire at least two pronunciations of the polyphonic word segment.

The second pronunciation determining module 16 is used for: when the number of pronunciations is equal to 1, determining the default pronunciation as a current pronunciation of the word segment.

In a specific implementation, when the number of pronunciations is equal to 1, the second pronunciation determining module 16 determines the default pronunciation as the current pronunciation of the word segment.

The pronunciation acquisition module 11 is used for: when phonetic annotation is performed on the polyphonic word segment in the input text, acquiring the at least two pronunciations of the polyphonic word segment.

In a specific implementation, the Chinese character phonetic annotation apparatus 1 acquires the text of the user, and when the Chinese character phonetic annotation apparatus 1 performs phonetic annotation on the polyphonic word segment in the text, the pronunciation acquisition module 11 acquires the at least two pronunciations of the polyphonic word segment.

The prediction module 12 is used for predicting a probability of each pronunciation in the at least two pronunciations, and generating a prediction result.

In a specific implementation, after the pronunciation acquisition module 11 acquires the at least two pronunciations of the polyphonic word segment, the prediction module 12 acquires a probability value of each pronunciation in the at least two pronunciations, and generates a prediction result according to a numerical value of the probability value of each pronunciation.

Specifically, FIG. 5 is a schematic structural diagram of a prediction module according to an embodiment of the present technology. As shown in FIG. 5, the prediction module 12 may include a probability acquisition unit 121 and a result generation unit 122.

The probability acquisition unit 121 is used for acquiring the probability value of each pronunciation in the at least two pronunciations.

In a specific implementation, after the pronunciation acquisition module 11 acquires the at least two pronunciations of the polyphonic word segment, the probability acquisition unit 121 acquires the probability value of each pronunciation in the at least two pronunciations.

Further, the Chinese character phonetic annotation apparatus 1 pre-stores a training corpus including specific polyphonic word segments, and acquires a CRF model of each polyphonic word segment in the specific polyphonic word segments by using a CRF training algorithm, where the CRF model is a model established by the Chinese character phonetic annotation apparatus 1 by analyzing language characteristics (for example, a preceding word, a succeeding word, a part of speech, the beginning of a sentence, the ending of a sentence, and other specific phrases or sentence structures) of the training corpus. The Chinese character phonetic annotation apparatus 1 may acquire a CRF model of the polyphonic word segment according to the pre-stored training corpus, and acquire the probability value of each pronunciation in the at least two pronunciations by analyzing word segment characteristics (for example, a preceding word, a succeeding word, a part of speech, the beginning of a sentence, the ending of a sentence, and other specific phrases or sentence structures) of the polyphonic word segment in the text.

The result generation unit 122 is used for generating the prediction result according to the numerical value of the probability value of each pronunciation.

In a specific implementation, the result generation unit 122 generates the prediction result according to the numerical value of the probability value of each pronunciation. Further, the result generation unit 122 acquires a difference between a first probability value and a second probability value in the probability values of the pronunciations. When the difference is greater than a preset threshold, the result generation unit 122 determines that a pronunciation corresponding to the first probability value is a pronunciation having the highest priority. When the difference is less than or equal to the preset threshold, the result generation unit 122 determines that the default pronunciation is the pronunciation having the highest priority. The first probability value is the largest probability value in the probability values of the pronunciations, the second probability value is a second largest probability value in the probability values of the pronunciations, and the preset threshold is set according to human experience.

Referring to the foregoing example, the polyphonic word segment is "长长", and has three pronunciations, which are "chang2 chang2, zhang3 chang2, and zhang3 zhang3" separately, and corresponding probability values acquired by analyzing are 0.2, 0.1, and 0.7. Therefore, the first probability value is 0.7, and the second probability value is 0.2. It is assumed that the preset threshold is 0.1, because a difference between the first probability value and the second probability value is 0.5, and is greater than the preset threshold, a pronunciation corresponding to the first probability value, that is, "zhang3 zhang3", is determined as the pronunciation having the highest priority.

Specifically, FIG. 6 is a schematic structural diagram of a result generation unit according to an embodiment of the present technology. As shown in FIG. 6, the result generation unit 122 may include: a difference acquisition subunit 1221, used for acquiring the difference between the first probability value and the second probability value in the probability values of pronunciations; a first determining subunit 1222, used for: when the difference is greater than a preset threshold, determining that a pronunciation corresponding to the first probability value is a pronunciation having the highest priority; and a second determining subunit 1223, used for: when the difference is less than or equal to the preset threshold, determining that the default pronunciation is the pronunciation having the highest priority.

In a specific implementation, the difference acquisition subunit 1221 acquires the difference between the first probability value and the second probability value in the probability values of the pronunciations. When the difference is greater than the preset threshold, the first determining subunit 1222 determines that the pronunciation corresponding to the first probability value is the pronunciation having the highest priority. When the difference is less than or equal to the preset threshold, the second determining subunit 1223 determines that the default pronunciation is the pronunciation having the highest priority. The first probability value is the largest probability value in the probability values of the pronunciations, the second probability value is a second largest probability value in the probability values of the pronunciations, and the preset threshold is set according to human experience.

Referring to the foregoing example, the polyphonic word segment is "长长", and has three pronunciations, which are "chang2 chang2, zhang3 chang2, and zhang3 zhang3" separately, and corresponding probability values acquired by analyzing are 0.2, 0.1, and 0.7. Therefore, the first probability value is 0.7, and the second probability value is 0.2. It is assumed that the preset threshold is 0.1, because a difference between the first probability value and the second probability value is 0.5, and is greater than the preset threshold, a pronunciation corresponding to the first probability value, that is, "zhang3 zhang3", is determined as the pronunciation having the highest priority.

In the embodiment of the present technology, when phonetic annotation is performed on a polyphonic word segment in an input text, a probability of each pronunciation in at least two pronunciations of the polyphonic word segment is predicted, and a current pronunciation of the polyphonic word segment is determined according to a prediction result, which implements accurate phonetic annotation of the polyphonic word segment; and the number of pronunciations and the default pronunciation are searched for by means of a combination of a part of speech and a word segment, and a pre-established character dictionary including pronunciations of all word segments and phrase dictionary of commonly used phrases, and a pre-stored training corpus are used, which can further improve the accuracy of phonetic annotation, and improve the efficiency and effects in text reading, thereby improving effects in Chinese learning.

FIG. 7 is a block diagram illustrating a representative device 700 in accordance with some embodiments. Device 700, typically, includes one or more processing units (CPUs) 702, one or more network interfaces 704, memory 706, and one or more communication buses 708 for interconnecting these components (sometimes called a chipset). Device 700 also optionally includes a user interface 710. User interface 710 includes one or more output devices 712 that enable presentation of media content, including one or more speakers and/or one or more visual displays. User interface 710 also includes one or more input devices 714, including user interface components that facilitate user input such as a keyboard, a mouse, a voice-command input unit or microphone, a touch screen display, a touch-sensitive input pad, a gesture capturing camera, or other input buttons or controls. Furthermore, some devices 700 use a microphone and voice recognition or a camera and gesture recognition to supplement or replace the keyboard. Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium.

In some implementations, memory 706, or the non-transitory computer readable storage medium of memory 706, stores the following programs, modules, and data structures, or a subset or superset thereof:

Operating System 716 including procedures for handling various basic system services and for performing hardware dependent tasks, this is also referred to as the kernel or includes the kernel;

Network Communication Module 718 for connecting device 700 to other computing devices (e.g., a server or other devices) connected to one or more networks via one or more network interfaces 704 (wired or wireless);

Presentation Module 720 for enabling presentation of information (e.g., a user interface for application(s) 726, widgets, websites and webpages thereof, and/or games, audio and/or video content, text, etc.) at device 700 via one or more output devices 712 (e.g., displays, speakers, etc.) associated with user interface 710;

Input Processing Module 722 for detecting one or more user inputs or interactions from one of the one or more input devices 714 and interpreting the detected input or interaction;

Applications 726 for execution by the device 700;

Annotation Manager 726, which provides data processing and functionalities for phonetically annotating text as described in the present disclosure. The annotation manager 726 includes one or more of but not limited to the following sub-modules:

Obtaining Module 728 to obtain input text to be phonetically annotated;

Analysis Module 730 to segment the input text into word segments and analyze the probability for each pronunciation of each polyphonic word segment in accordance with the techniques described in the present disclosure;

Pronunciation Selection Module 732 for selecting a single pronunciation for each word segment in accordance with the techniques described in the present disclosure, including the probabilities for the pronunciations for each polyphonic word segment;

Model Generation Module 734 to generate the probability models for each polyphonic word segment based on a training corpus; and Other modules 736 for implementing other functions involved in phonetically annotating text described herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

While particular embodiments are described above, it will be understood it is not intended to limit the disclosure to these particular embodiments. On the contrary, the disclosed technology includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the disclosed technology to the precise forms disclosed. Many modifications and variations are possible in view of the above teachings. The embodiments were chosen and described in order to best explain the principles of the disclosed technology and its practical applications, to thereby enable others skilled in the art to best utilize the disclosed technology and various embodiments with various modifications as are suited to the particular use contemplated.

What is claimed is:

1. A method, comprising:
    at a computing device having one or more processors and memory:

receiving a text input from a user, including receiving copied or scanned text for which context-appropriate phonetic annotation is to be performed at the computing device;

identifying a first polyphonic word segment and a first monophonic word segment in the text input, the first polyphonic word segment having at least a first pronunciation and a second pronunciation that is distinct from the first pronunciation, and the first monophonic word segment having a single pronunciation;

determining at least a first probability corresponding to the first pronunciation being a correct pronunciation for the first polyphonic word segment and a second probability corresponding to the second pronunciation being the correct pronunciation for the first polyphonic word segment, wherein the first probability is greater than the second probability;

determining a predetermined threshold difference based on: (1) a comparison of the first probability and the second probability with a preset threshold probability value, respectively, and (2) a magnitude of a difference between the first probability and the second probability;

comparing the difference between the first probability and the second probability with the predetermined threshold difference; and selecting the first pronunciation as a current pronunciation for the first polyphonic word segment in accordance with a determination that the difference between the first probability and the second probability exceeds the predetermined threshold difference; and in a text presentation user interface, displaying the input text concurrently with context-appropriate pronunciation annotations to facilitate a user's reading the input text aloud, including:

phonetically annotating the first monophonic word segment in the displayed input text with the single pronunciation of the first monophonic word segment;

phonetically annotating the first polyphonic word segment in the displayed input text with the first pronunciation of the first polyphonic word segment; and forgoing phonetically annotating the first polyphonic word segment in the displayed input text with the second pronunciation of the first polyphonic word segment.

2. The method of claim 1, further comprising:
obtaining the text input for phonetic annotation;
determining whether the text input contains at least one polyphonic character; and
in accordance with a determination that the text input includes at least one polyphonic character, segmenting the text input into a plurality of word segments including the first polyphonic word segment.

3. The method of claim 2, further comprising:
determining whether the plurality of word segments contain at least one polyphonic word segment, wherein the identification of the first polyphonic word segment in the text input is performed in accordance with a determination that the plurality of word segments contains at least one polyphonic word segment.

4. The method of claim 1, further comprising:
selecting a current value for the predetermined threshold difference based on the first probability and the second probability.

5. The method of claim 4, wherein selecting the current value for the predetermined threshold difference based on the first probability and the second probability further comprises:
selecting a first difference value for the predetermined threshold difference when both the first and the second probabilities are above a predetermined threshold probability value; and
selecting a second difference value for the predetermined threshold difference when the first probability is above the predetermined threshold probability value and the second probability is below the predetermined threshold probability value.

6. The method of claim 5, wherein the first difference value is smaller than the second difference value.

7. The method of claim 6, wherein the first pronunciation and the second pronunciation have the two largest probabilities among all pronunciations of the first polyphonic word segment.

8. A non-transitory computer-readable medium having instructions stored thereon, the instructions, when executed by one or more processors cause the processors to perform operations comprising:

receiving a text input from a user, including receiving copied or scanned text for which context-appropriate phonetic annotation is to be performed at the computing device;

identifying a first polyphonic word segment and a first monophonic word segment in the text input, the first polyphonic word segment having at least a first pronunciation and a second pronunciation that is distinct from the first pronunciation, and the first monophonic word segment having a single pronunciation;

determining at least a first probability corresponding to the first pronunciation being a correct pronunciation for the first polyphonic word segment and a second probability corresponding to the second pronunciation being the correct pronunciation for the first polyphonic word segment, wherein the first probability is greater than the second probability;

determining a predetermined threshold difference based on: (1) a comparison of the first probability and the second probability with a preset threshold probability value, respectively, and (2) a magnitude of a difference between the first probability and the second probability;

comparing the difference between the first probability and the second probability with the predetermined threshold difference; and selecting the first pronunciation as a current pronunciation for the first polyphonic word segment in accordance with a determination that the difference between the first probability and the second probability exceeds the predetermined threshold difference; and in a text presentation user interface, displaying the input text concurrently with context-appropriate pronunciation annotations to facilitate a user's reading the input text aloud, including:

phonetically annotating the first monophonic word segment in the displayed input text with the single pronunciation of the first monophonic word segment;

phonetically annotating the first polyphonic word segment in the displayed input text with the first pronunciation of the first polyphonic word segment; and forgoing phonetically annotating the first polyphonic word segment in the displayed input text with the second pronunciation of the first polyphonic word segment.

9. The computer-readable medium of claim 8, wherein the operations further comprise:
obtaining the text input for phonetic annotation;
determining whether the text input contains at least one polyphonic character; and
in accordance with a determination that the text input includes at least one polyphonic character, segmenting the text input into a plurality of word segments including the first polyphonic word segment.

10. The computer-readable medium of claim 9, wherein the operations further comprise:
determining whether the plurality of word segments contain at least one polyphonic word segment, wherein the identification of the first polyphonic word segment in the text input is performed in accordance with a determination that the plurality of word segments contains at least one polyphonic word segment.

11. The computer-readable medium of claim 8, wherein the operations further comprise:
selecting a current value for the predetermined threshold difference based on the first probability and the second probability.

12. The computer-readable medium of claim 11, wherein selecting the current value for the predetermined threshold difference based on the first probability and the second probability further comprises:
selecting a first difference value for the predetermined threshold difference when both the first and the second probabilities are above a predetermined threshold probability value; and
selecting a second difference value for the predetermined threshold difference when the first probability is above the predetermined threshold probability value and the second probability is below the predetermined threshold probability value.

13. The computer-readable medium of claim 12, wherein the first difference value is smaller than the second difference value.

14. The computer-readable medium of claim 13, wherein the first pronunciation and the second pronunciation have the two largest probabilities among all pronunciations of the first polyphonic word segment.

15. A system, comprising:
one or more processors; and
memory having instructions stored thereon, the instructions, when executed by the one or more processors, cause the processors to perform operations comprising:
receiving a text input from a user, including receiving copied or scanned text for which context-appropriate phonetic annotation is to be performed at the computing device;
identifying a first polyphonic word segment and a first monophonic word segment in the text input, the first polyphonic word segment having at least a first pronunciation and a second pronunciation that is distinct from the first pronunciation, and the first monophonic word segment having a single pronunciation;
determining at least a first probability corresponding to the first pronunciation being a correct pronunciation for the first polyphonic word segment and a second probability corresponding to the second pronunciation being the correct pronunciation for the first polyphonic word segment, wherein the first probability is greater than the second probability;
determining a predetermined threshold difference based on: (1) a comparison of the first probability and the second probability with a preset threshold probability value, respectively, and (2) a magnitude of a difference between the first probability and the second probability;
comparing the difference between the first probability and the second probability with the predetermined threshold difference; and
selecting the first pronunciation as a current pronunciation for the first polyphonic word segment in accordance with a determination that the difference between the first probability and the second probability exceeds the predetermined threshold difference; and
in a text presentation user interface, displaying the input text concurrently with context-appropriate pronunciation annotations to facilitate a user's reading the input text aloud, including:
phonetically annotating the first monophonic word segment in the displayed input text with the single pronunciation of the first monophonic word segment;
phonetically annotating the first polyphonic word segment in the displayed input text with the first pronunciation of the first polyphonic word segment; and
forgoing phonetically annotating the first polyphonic word segment in the displayed input text with the second pronunciation of the first polyphonic word segment.

16. The system of claim 15, wherein the operations further comprise:
obtaining the text input for phonetic annotation;
determining whether the text input contains at least one polyphonic character; and
in accordance with a determination that the text input includes at least one polyphonic character, segmenting the text input into a plurality of word segments including the first polyphonic word segment.

17. The system of claim 16, wherein the operations further comprise:
determining whether the plurality of word segments contain at least one polyphonic word segment, wherein the identification of the first polyphonic word segment in the text input is performed in accordance with a determination that the plurality of word segments contains at least one polyphonic word segment.

18. The system of claim 15, wherein the operations further comprise:
selecting a current value for the predetermined threshold difference based on the first probability and the second probability.

19. The system of claim 18, wherein selecting the current value for the predetermined threshold difference based on the first probability and the second probability further comprises:
selecting a first difference value for the predetermined threshold difference when both the first and the second probabilities are above a predetermined threshold probability value; and
selecting a second difference value for the predetermined threshold difference when the first probability is above the predetermined threshold probability value and the second probability is below the predetermined threshold probability value.

20. The system of claim 19, wherein the first difference value is smaller than the second difference value.

* * * * *